Oct. 20, 1959     F. J. BAGEMAN     2,909,063
STATIC WHEEL BALANCER
Filed Sept. 4, 1958     3 Sheets-Sheet 1
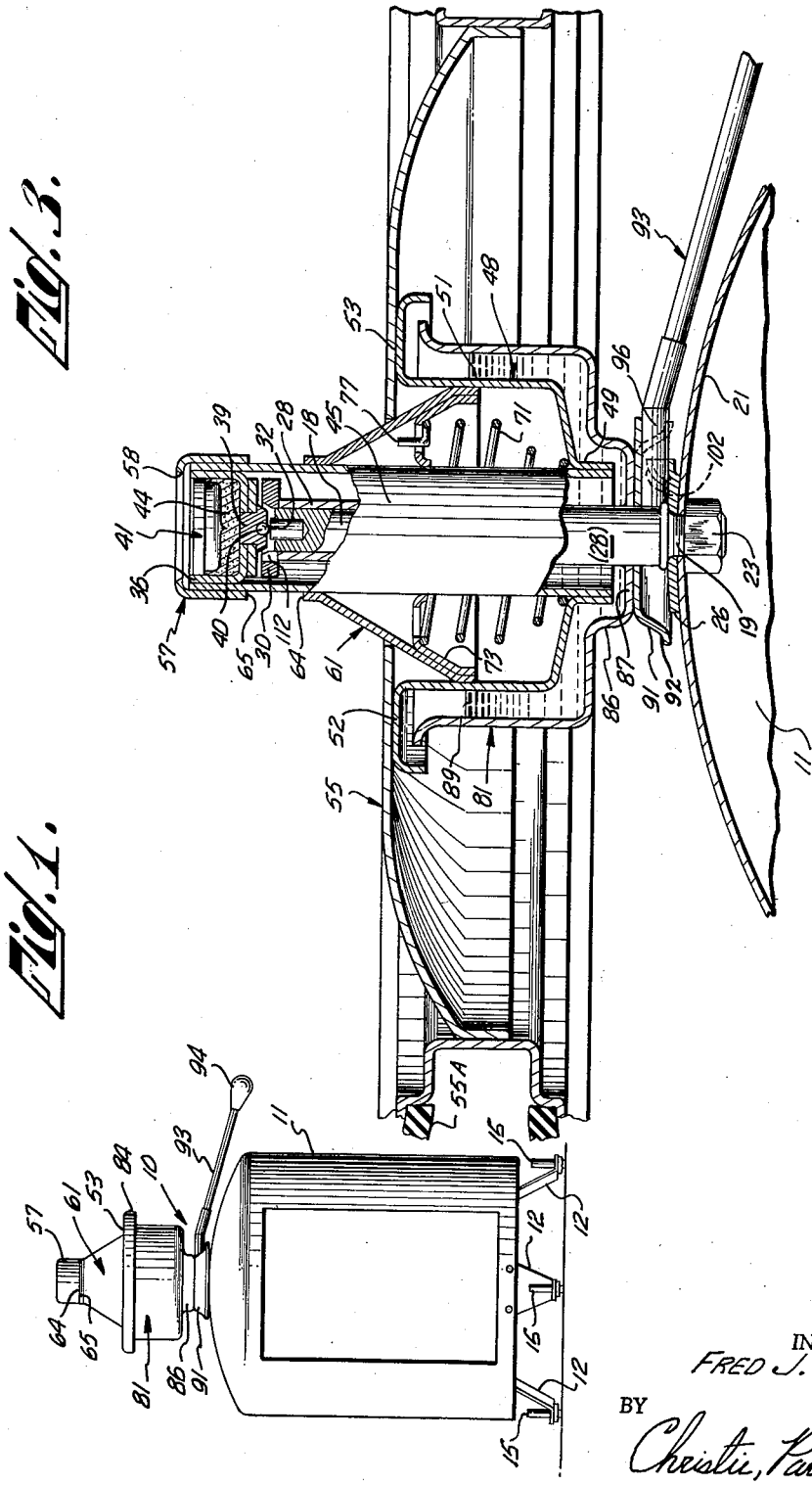
INVENTOR.
FRED J. BAGEMAN
BY
Christie, Parker & Hale
ATTORNEYS.

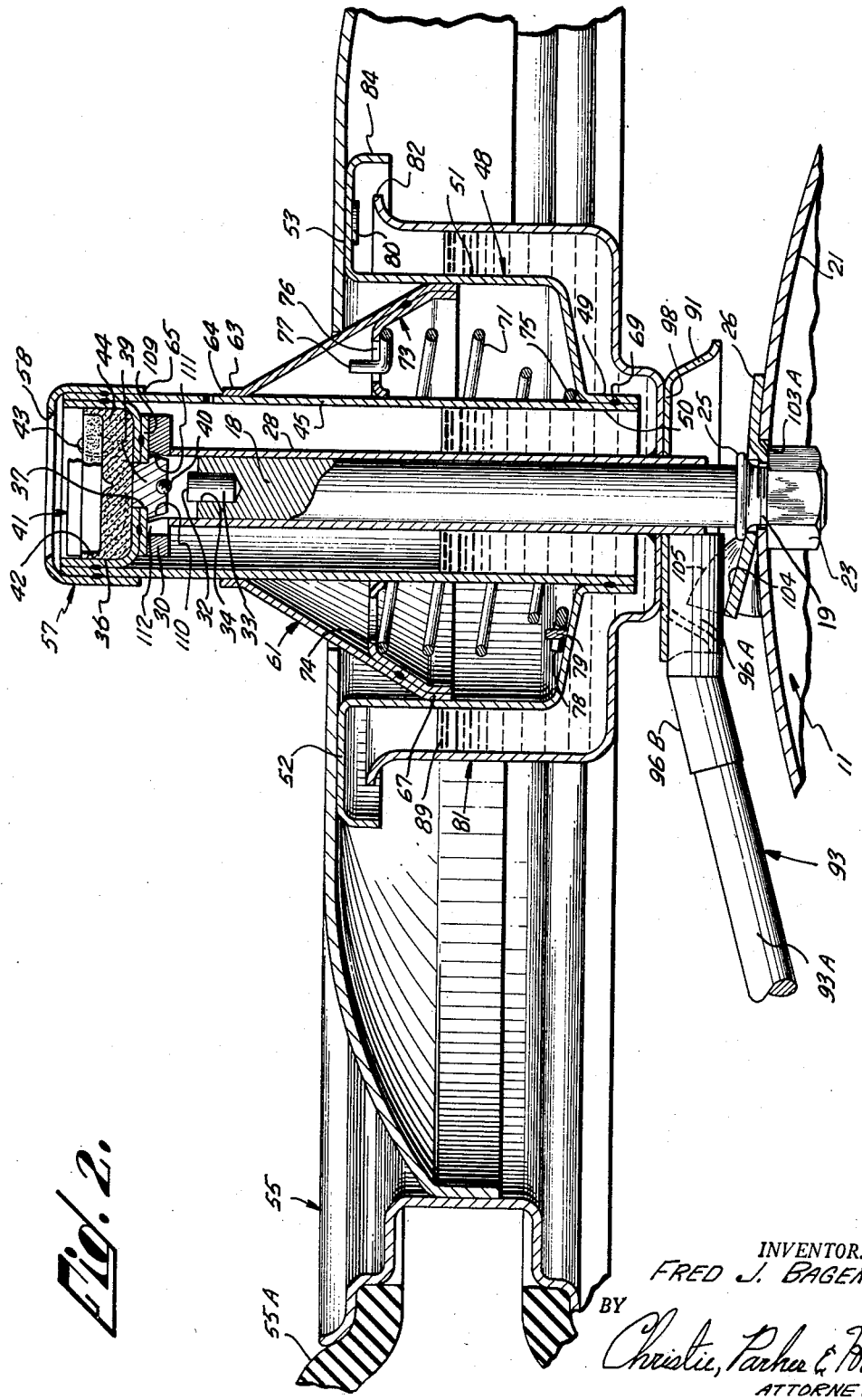

Oct. 20, 1959   F. J. BAGEMAN   2,909,063
STATIC WHEEL BALANCER
Filed Sept. 4, 1958   3 Sheets-Sheet 3

INVENTOR.
FRED J. BAGEMAN
BY
Christie, Parker & Hale
ATTORNEYS.

United States Patent Office 2,909,063
Patented Oct. 20, 1959

2,909,063

STATIC WHEEL BALANCER

Fred J. Bageman, Pasadena, Calif.

Application September 4, 1958, Serial No. 759,043

5 Claims. (Cl. 73—484)

The invention relates to wheel balancers and more particularly to static wheel balancers for automobile wheels.

Two persistent problems in achieving the static balance of automobile wheels are the problems of balancer sensitivity itself and the maintenance of that sensitivity over the life of the balancer. Conventional static wheel balancers utilize a wheel holding assembly universally tiltable on a pivot point. If the balancer is to have great accuracy and sensitivity, the pivot balance point of necessity must be precise. The shock of loading a wheel and tire to be balanced on such a point normally damages the point. The damage may be minute but accumulates as the machine is used, and sensitivity is lost and accuracy impaired.

Another problem of conventional wheel balancers is that they have no efficient means of multiplying the actual tilting of the wheel supporting assembly due to wheel imbalance so that the magnitude of the tilting due to imbalance is readily recognizable. Mechanical multiplying means such as lever arms, dial indicators, etc., merely add error factors to the machine which are multiplied faster than the advantageous factors in precise operation.

I have invented a static wheel balancer having a great sensitivity and accuracy and capable of maintaining those qualities for long periods of use.

The invention contemplates in wheel balancing apparatus which has a base member and a vertical support extending from the base member and a wheel support assembly tiltable with respect to the support, the combination which comprises in part a spirit level receptacle tiltable with the wheel support assembly and a spirit, or bubble, level in the receptacle. The bottom of the receptacle has a planar registry surface. The combination further comprises a planar pivot surface on the support with a pivot ball protruding from the receptacle or cup. The pivot ball and pivot plane are adapted to form a pivot point about which the wheel support assembly is freely tiltable with respect to the vertical support. Preferably the cup supports a downwardly depending column which holds preferred wheel support assembly components: a centering cone and a wheel support member or flange. The combination further includes a lift sleeve movable along the support against the registry surface for changing the position of the ball. A cam fixed to the base member and means cooperating therewith move the lift sleeve along the vertical support.

Preferably, the centering cone is spring-loaded with respect to the wheel support member so that relative vertical motion is possible between the two. Thus, when a wheel and tire assembly is placed upon the balancer for balancing, the inner hub opening of the wheel first contacts the centering cone to begin to center the wheel with respect to the pivot point of the balancer. Then the wheel is guided downwardly as the cone compresses the spring until the wheel rests upon the wheel support member at which time the wheel is centered within the tolerances of the device. The spring, which may be of a helical type, surrounds the support column and the support rod. The spring is preferably formed to be fixed at one of its ends to the centering cone and at the other with respect to a wheel support member flange so that any deviation circumferentially of the cone with respect to the flange is corrected by the spring.

These components and the others which tilt with the wheel support assembly are carefully balanced after assembly. One function of the spring form is to insure no balance shift of the related parts in use.

The extreme sensitivity of the wheel balancer which embodies the invention would normally lead to a time consuming continuing oscillation of the tiltable portion of the wheel balancer under the load imposed by the wheel and tire being balanced. Therefore, in the preferred embodiment of the invention there is a fluid cup into which a portion of the wheel support member projects so that the fluid therein can damp the oscillating motion.

A balancer in accordance with the invention can achieve a sensitivity of 1.6 ounce inches. Sensitivity is a measure determined by the smallest amount of weight which when placed on the rim of a wheel causes a clearly visible movement of the indicator or bubble. The measure is achieved by multiplying the amount of weight needed for perceptible motion by the radial distance from the center of the wheel. If the bubble or other indicator moves under the influence of a two-tenths ounce weight 8 inches from the center of the wheel, a sensitivity of 1.6 ounce inches is indicated.

Sensitivity without accuracy is of no value. Therefore, the wheel balancer of my invention is designed to be adjustable for accuracy within the limits of its sensitivity. Accuracy also is measurable in terms of ounce inches. Production models of balancers in accordance with the invention are accurate to within 2.0 ounce inches.

The sensitivity and accuracy achieved by a balancer in accordance with the invention enables not only a quicker indication of automobile wheel imbalance, but also lends itself to the process described in my co-pending patent application, Serial No. 643,761, filed March 4, 1957, and entitled Wheel Balancing. In this system a few wheel weight sizes are made to approximate an infinite number of wheel weight sizes by distributing the weights with respect to the light spot on the tire and wheel assembly. This requires a balancer of greater sensitivity than that has heretofore been available. However, conventional methods of applying wheel weights to automobile wheels also benefit by the sensitivity of the machine of my invention. These and other advantages of the invention are apparent in the following detailed description and drawings in which:

Fig. 1 is an elevational view of the preferred embodiment of my invention;

Fig. 2 is a fragmentary elevation partly in section showing the wheel balancer of Fig. 1 when it first receives a wheel and tire assembly to be balanced;

Fig. 3 is a fragmentary elevation similar to Fig. 2 and showing the position of the wheel and balancer when ready for balancing;

Figure 4:
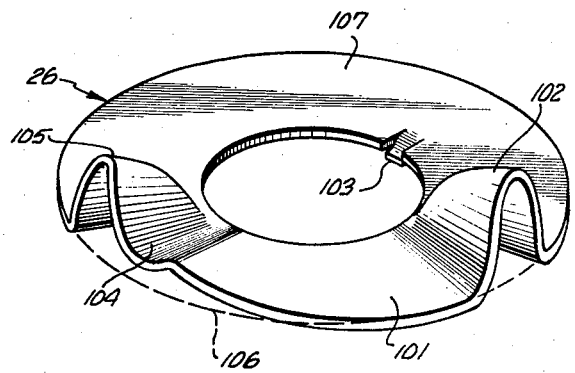
Fig. 4 is a perspective drawing of a cam which cooperates with the lift sleeve to achieve the two positions shown in preceding figures.

Referring now to Figs. 1, 2 and 3, a wheel balancer indicated generally by the reference character 10 has a base member 11 which may be a hollow cylindrical chamber in which tools, supplies, etc., may be stored. The base member is primarily useful for raising the tilting components of the wheel balancer to convenient working height. The base member rests upon legs 12, equipped with leveling screws 15 which may be turned within threaded holes (not shown) in the legs to balance the machine.

A support rod 18 extends upwardly from the top of the base member. The support rod has a threaded end 19 extending downwardly through the upper wall 21 of the base member, and is held rigidly with respect thereto by a nut 23 which also clamps a cam plate 26 between the upper wall and a flange 25 near the lower end of the support rod. The configuration of the cam plate is explained in detail later. Surrounding the support rod is a lift sleeve 28 which is co-extensive with the support rod. The lower end of the sleeve terminates near the upper face of flange 25. The upper end of the lift sleeve has a lift collar 30 which extends outwardly beyond the periphery of the sleeve.

A pivot plane 32 extends horizontally slightly above the upper surface of the support rod. The pivot plane may be the polished end of a cylindrical plug 33 fitted centrally into a cavity 34 within the support rod. Pivot plane 32 and upper face 35 of the lift collar are machined parallel at assembly.

A pivot cup 36 adapted to be supported upon the pivot plane has a lower central opening 37 into which a pivot boss 39 is fixed. Fitted into the downwardly oriented face of the boss is a pivot ball 40. Only a slight portion of the ball periphery protrudes from the boss. The ball makes a theoretical point contact with the pivot plane supported by rod 18, as shown in Fig. 3.

A cylindrical spirit level 41 resides within the pivot cup. The sidewall 42 of the cup has a plurality of apertures 43. The spirit level is seated within the cup in a bed 44 of cement such as plaster of Paris which protrudes through the apertures 43 and when dry, keys the level within the cup. The use of cement to mount the spirit level permits easy assembly of the level with respect to the other components of the balancer so that the level truly indicates the horizontal condition of the wheel supporting components.

Sidewall 42 of the pivot cup supports a tubular column 45 which depends downwardly in spaced relationship about the support rod and lift sleeve. The column terminates a relatively short distance above the upper wall 21 of the base member. A wheel support member 48 having a small bottom annulus 49 is fixed to a lower portion 50 of the column. The wheel support member flares outwardly from the annulus to an upstanding annular wall 51 from whose top edge projects an outward flange 52. The flange has a planar upper surface 53 adapted to contact and support the disc portion of an automobile wheel to be balanced. Such a wheel 55 is shown fragmentarily in Figs. 2 and 3.

The column is rigidly fixed to the pivot cup as by spot welding. A partially closed cap 57 tops the column and extends a short distance downwardly along the periphery of the column. The upper surface of the cap has an aperture 58 through which the bubble in spirit level 41 may be viewed. A centering cone 61 is slidably mounted about the column. The cone flares downwardly and outwardly from an upper cone ring 63. The cone ring has an upper surface 64 which normally abuts against a lower shoulder 65 of cap 57 as shown in Fig. 1. The lower portion of the cone is a substantially vertical skirt 67 having an outer diameter making a sliding fit with the inner diameter of wheel support member 48. The cone is therefore slidable vertically within the wheel support member.

As mentioned before, the wheel support member is fixed as by spot welds 69 to the bottom portion of the column. The centering cone is slidable with respect to the column and therefore movable with respect to the wheel support member. This relative motion is guided vertically by the support column and downward relative motion is resisted by a helical compression spring 71 enclosed in part by the wheel support member. The upper portion of the spring bears against an inverted cup 73 fixed within the bottom of the centering cone. The top turn 74 of the spring fits into the fillet joining the side and top walls of inverted cup 73. Similarly, bottom turn 75 of the spring registers in the annulus formed by the juncture of ring 49 and the outward flare of the wheel support member. The spring is thereby prevented from shifting its balance position with respect to the axis of the column.

The top wall of the inverted cup has a plurality of holes 76. A free upper end 77 of spring 71 projects upwardly through one of the holes 76. A lower end 78 of the spring is fixed to the wheel support member by a tab 79 through which end 78 of the spring extends. Any twist of the centering cone with respect to the wheel member is opposed by the spring, maintaining the alignment of those two members.

Components of the wheel support assembly, including all those items such as the column, support flange, cone, spring and spirit level, are precisely balanced after assembly. Balancing may necessitate a small balance lug 80, which is preferably welded to the underside of wheel support flange 52, as shown in Fig. 2. The above described spring configuration insures that the orientation of the spring and centering cone with respect to the longitudinal axis of column 45 is maintained, thereby obviating the expensive procedure of balancing each individual component of the tilting wheel support assembly.

An upwardly opening fluid chamber 81 surrounds wheel support member 48. An upper lip 82 of the fluid chamber extends upwardly to a point slightly below the support flange 52 of wheel support member 48. A flange skirt 84 extends downwardly from the outer edge of the wheel support flange, shielding outwardly curling lip 82 of the fluid chamber. The lower portion of the fluid chamber is stepped down in diameter to a smaller portion 86 having a bottom wall 87. The bottom wall is fixed to sleeve 28 and sealed thereto so that no fluid may leak from the chamber. The chamber is normally filled with a damping oil 89 such as commonly used for this purpose. The damping fluid has a viscosity equivalent to a conventional 140 weight gear oil.

As can be seen in Fig. 3, any tilting motion of wheel 55 and its tire 55A with respect to the pivot point formed at the juncture of pivot ball 40 and pivot plane 32 results in a displacement by wheel support sidewall 51 of fluid 89 within the chamber. Thus unwanted oscillatory motion of the wheel support member can be substantially eliminated by controlling the viscous resistance of the fluid within the chamber to the oscillation of the wheel support member.

The pivot ball and plane are protected against abuse by positioning the lift sleeve upwardly about the support rod prior to placing a wheel and tire on the balancing machine. Although the spring-loaded cone can absorb a portion of any suddenly imposed load, positive separation of the components of the pivot point insures long lived sensitivity and accuracy. The aperture of lift collar 30 and the rim of pivot boss 39 are chamfered so that upward motion of the lift sleeve centers the pivot ball and hence the pivot cup with respect to the support rod.

A shallow inverted bowl 91 revolves about the lower end of the support rod and the lift sleeve between the bottom wall 87 of the fluid chamber and the cam 26 which is fixed to the base member. Skirt 92 of the bowl shrouds the cam from dirt. A control handle 93 is fixed to the bowl. The control handle has a conventional grip knob 94 at its end remote from the support rod. A bent sleeve portion 96 is fixed to the under side of an upper wall 98 of inverted bowl 91. The bent sleeve has two parts; a substantially horizontal portion 96A fixed to the inverted bowl and a downwardly slanting portion 96B in which a handle shank 93A is joined. Horizontal sleeve portion 96A rides along a substantially flat cam surface 101 of cam plate 26. In the position shown in Fig. 3 the handle lodges against a raised cam stop 102 outlined in dotted lines. The cam stop is maintained in the same position with respect to the base member by an integral key 103 formed on the cam and fitted into a key hole 103A located in upper wall 21 of the base member adjacent the support rod. The cam plate is welded in position on the base member at assembly. When the control handle is positioned against cam stop 102 the wheel balancer of the invention is ready to indicate the imbalance of whatever wheel and tire assembly is then on the machine.

Pivot ball 40 seats upon pivot plane 32 when the handle is against stop 102. The weight of the tiltable wheel support assembly and the tested wheel is upon the ball. The only opposition to tilting moment caused by an unbalanced wheel is the viscous fluid within the fluid chamber. Therefore, the wheel and the wheel support tilt about the contact point of the pivot ball and the pivot plane because the wheel support is rigidly fixed to the column 45 which in turn is fixedly secured to the pivot cup. The wheel support member, cone, column and pivot cup all tilt as a unit. Any tilt of this unitary group of course affects the spirit level 41 seated within the pivot cup.

Figure 5:
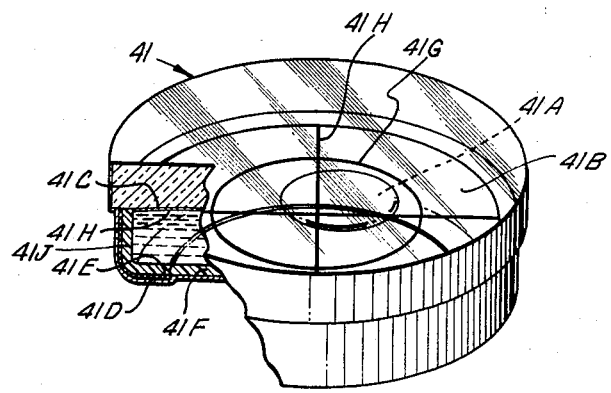
Fig. 5 is a perspective view partly broken away of the preferred spirit level of the invention.

As indicated in Fig. 5, a bubble 41A within the spirit level migrates across the center of the spirit level beneath the under surface of the transparent upper wall 41B of the level. The under surface 41C is a zone of a sphere having a large radius such as 25 inches. The large radius makes for extreme sensitivity. The spirit level of the invention differs from conventional spirit levels. The spirit level has a transparent bottom wall 41F and a transparent vertical side wall 41J. A narrow dark band of pigment 41E covers the outer surface of the vertical side wall, and an outer zone of the transparent bottom wall 41F. All of the outer surfaces of both the vertical side wall and the bottom wall are covered by a contrasting light colored pigment coating 41D. This outer coating is preferably opaque and covers the dark band of pigment 41E so that from the interior of the spirit level all of the dark band and a portion of the light band are visible. In use this dark or preferably black band contrasts with the lighter overall opaque covering and results in a black ring defining the edge of the bubble itself as it moves within the spirit level. This greatly heightens the visibility of the bubble enabling its relation to the indexing circle 41G and the cross hairs 41H to be clearly observed. The optical effect of the interface between the gas bubble and the liquid within the spirit level is to concentrate the reflection of the dark band at the aforesaid interface.

In the operation of the wheel balancer of the invention, the the first step is to move control handle 93 so that the handle rests within a shallow detent area 104 of cam plate 26. The area is best illustrated in Fig. 4. The detent area is adjacent a second cam stop 105 which with cam stop 102 limits the arcuate movement of control handle 93. In Fig. 4 a dotted line 106 represents the continuation of a flat surface 107 of the cam plate. The height to which cam slope 101 and detent area 104 raise the control handle may be gaged from this dotted line. As can be seen in Fig. 2, handle sleeve 96A rests in detent 104. The elevation of the handle presses bowl 91 (which turns freely about lift sleeve 28) against the bottom of the fluid chamber and raises the attached lift sleeve upwardly into contact with a disk 109 fixed to the bottom of the pivot cup. The pivot cup is lifted away from the pivot plane carried by the support rod. Since they are in fixed relationship to the pivot cup, column 45 and wheel support member 48 are likewise raised with respect to the support rod. The spring relationship between the cone and the wheel support member causes the cone to also be raised.

If it has not already been done so, the wheel balancer should now be leveled. The balancer is properly leveled when pivot plane 32 is horizontal. The accuracy of the balancer depends upon the preciseness with which this leveling step is accomplished. A variation of only one and one-half degrees from a true horizontal plane is permissible if the balancer is to maintain the accuracy standard of 2 ounce inches. No tools or measuring instruments are necessary to so level the preferred balancer of the invention. Registry surface 109A of disk 109 is precisely parallel to support surface 53 of wheel support flange 52. The spirit level is preferably mounted in its pivot cup or receptacle after this operation, and set in position while the support flange is jigged in a precisely horizontal position. Therefore, with the spirit level set exactly with respect to the wheel support flange, it thereafter indicates not only the true horizontal condition of the flange, but also registry surface 109A.

Figure 6:
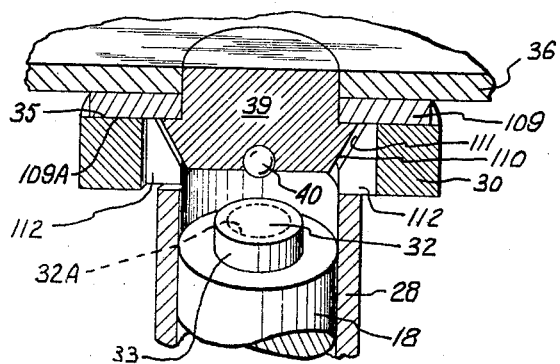
Fig. 6 is a fragmentary perspective view, partly in section, of the preferred pivot point apparatus of the invention.

As previously described, upper face 35 of the lift collar is parallel to the pivot plane on the support rod. In Fig. 6 lift sleeve 28 is elevated, lifting the pivot cup and the pivot ball by contact between upper face 35 of the lift collar and registry surface 109A of the pivot cup. The ball is now spaced from the pivot plane. It may be no longer located along the central axis of the vertical support rod. But it is supported upon surfaces parallel within machining tolerances to the pivot plane. If the pivot plane is level, the registry surface and hence the wheel support flange are level. The spirit level has been set in its cup with respect to the wheel support flange. When it indicates support flange levelness, the surfaces parallel to the flange, including the pivot plane, are likewise level.

Thus, the wheel balancer of the invention may be leveled by means of leveling screws 15 while the wheel support assembly rests in stable condition off the pivot plane. The spirit level is so designed that a position of the bubble wholly within circle 41G indicates that the mutually parallel surfaces are level within the tolerances necessary to have desired accuracy.

The chamfered edges of the pivot boss and the aperture of the lift collar cooperate to center the lifted pivot cup and its ball with respect to the pivot plane supported by the rod. In this position, with the ball safely out of contact with the pivot plane, wheel 55 is placed over the balancer. The cone which is normally in contact with cap 57 as shown in Fig. 1, is depressed downwardly against spring 71 until the wheel rests on flange surface 53 of the wheel support member. The loading shock has not, therefore, been transmitted to the pivot ball or plane, thereby preserving the most sensitive components of the balancer from damage.

When the wheel and tire to be balanced rest upon the wheel support member, handle 93 may be moved out of detent 104 and along cam surface 101 until the handle registers against cam stop 102. In this position (illustrated in Fig. 3) pivot ball 40 rests upon pivot plane 32 and the lift sleeve has returned to its lower position in which the lift collar is totally out of contact with the bottom of the pivot cup. Since the pivot cup has centered with respect to the pivot plane by the upward motion of the sleeve as described heretofore, there is no question of re-registry of pivot ball to pivot plane necessitating re-alignment of the machine, which has already been balanced. The pivot cup and the column, cone, and wheel support member dependent therefrom are now freely tiltable about the pivot point. If an imbalance exists in the wheel and tire assembly on the balancer, the bubble 41A will migrate from the central registry circle 41G toward the outer periphery of the bubble level. The bubble of course migrates toward the light spot of the wheel. It is with respect to this light spot that wheel weights are conventionally located. When this spot is marked on the tire or wheel rim the wheel itself may be turned on the balancer so that the light spot is toward the worker. The spring returns the cone to its original arcuate registry with the support flange in case any twist is imparted to the cone by the turning of the wheel.

Wheel weights are then tentatively placed upon the wheel and tire to determine the exact weight and position needed to correct the wheel imbalance. That is, wheel weights are located on the tire until the bubble once more migrates to center about the cross hair index lines 41H. Then the control handle 93 is moved against cam stop 105, disengaging the pivot ball from the pivot plane and the task of fixing the weights to the wheel rim may be accomplished without harmful shock being transmitted to the pivot ball and plane.

The degree of sensitivity and accuracy which distinguishes the balancer of the invention from previous machines stems largely from the return of the pivot ball to the pivot plane at substantially the same axial position, from balancing the machine itself while the wheel support is stable, and from the maintenance of the arcuate orientation of the centering cone with respect to the wheel support flange. Arcuate orientation is implemented by the compression spring. Sensitivity results because the same cone orientation is restored, despite movement with each wheel being balanced, with respect to the previously balanced wheel support assembly despite any arcuate change of the wheel about the balancer. The chamfered pivot boss 39 is sized so that its tapering periphery 110 leaves clearance between it and the chamfered inner periphery 111 of the aperture in lift collar 30. The amount of clearance determines the diameter of a small circle 32A of contact area on the pivot plane within which the theoretical contact point between pivot ball and pivot plane may vary. The upper limit of the clearance is the amount that the pivot point can deviate from the axis of the support rod and avoid contact between the column and the support rod when the wheel support assembly is tilted by an unbalanced tire and wheel assembly. A plurality of vertical slots 112 in the lift collar insure that no damping fluid reaches the pivot plane. Oscillation of the wheel support assembly is greatest when the pivot ball is free to tilt upon the pivot plane of plug 33, i.e., when the wheel assembly is being balanced. Oscillation of the wheel support assembly including the downwardly depending damping column 45 within the fluid is inhibited when the wheel support assembly is lifted on the lift sleeve and lift collar because of the relatively large area of support afforded by the lift collar. No appreciable displacement of damping fluid takes place upwardly in the aperture between the column 45 and lift sleeve 28 except when the wheel support assembly is freely pivotable upon the pivot plane. The vertical slots 112 open below the top surface of support rod 18. The plane is higher than the upper surface of rod 18, and the slots drain any fluid away before the fluid level rises to the height of the pivot plane. If damping fluid reaches the pivot plane, it affords a film to which dirt and other abrasives may adhere. Such foreign particles increase wear and interfere with the precise tilting of the wheel support assembly with respect to the pivot plane. The position of the vertical slots when the ball rests upon the pivot plane is such that the slots open below the level of he pivot plane itself. Thus any oil which reaches the support post drains through the slots rather than flooding over the pivot plane.

The position within the circle of the theoretical contact point is determined by accidental displacement of the wheel support assembly on the lift collar and by the direction in which the wheel on the balancer tilts when the wheel support assembly is lowered by motion of control handle 93, replacing pivot ball 40 on the pivot plane. Therefore, the point within the limiting contact area at which the ball contacts the plane is randomly determined for each wheel assembly balanced. Wear is inconstant therefore, at any single point on the pivot plane. Consequently, the sensitivity life of the balancer is greatly prolonged. Thus, while the pivot ball descends at slightly differing points within the limited contact area, the geometric relationship between the pivot point, the centering cone and the wheel support flange is substantially maintained by the structure of the invention. Once the base member has been adjusted so that the spirit level truly indicates the horizontal condition of the support flange and the pivot plane the relationship between cone, flange and pivot point is fixed. No adjustments are necessary in normal usage to continue this relationship and the accuracy and sensitivity which stem from it.

I claim:

1. In an automotive wheel balancer having a base member from which a support rod extends vertically and a wheel support assembly tiltable with respect to the support rod the combination comprising a pivot plane supported centrally of the support rod, a pivot cup, a pivot boss projecting downwardly from the cup, a pivot ball held partially within the boss and adapted to contact the pivot plane, a spirit level seated within the pivot cup so that it indicates the true horizontal condition of the wheel support assembly when the pivot ball seats freely on the pivot plane, a lift sleeve disposed about the support rod, a lift collar disposed at the top of the lift sleeve, a chamfered aperture disposed centrally of the lift collar, a tapered periphery on a portion of the pivot boss extending below the pivot cup, the periphery of the pivot boss being coaxially oriented with respect to the pivot ball in the boss, the diameters of the tapered periphery and the chamfered aperture being such that an annular clearance exists between the periphery and the aperture when the pivot ball seats upon the pivot plane, a tubular column fixed to the pivot cup and depending therefrom about the lift sleeve, a wheel support member fixed to the column, a compression spring about the column so as to bear against the wheel support member, a centering cone slidable along the column against the compression spring, a wheel support flange on the wheel support member, the support member, centering cone, pivot cup and column defining the wheel support assembly, a fluid chamber disposed co-axially about the wheel support member, the fluid chamber being fixed at its bottom wall to the lift sleeve, an inverted bowl rotatably disposed about the lift sleeve, a cam plate fixed to the base member and disposed about the support rod, a control handle fixed to the inverted bowl and movable along the cam plate, the cam plate being adapted to move the control handle and the inverted bowl vertically to displace the bottom wall of the fluid chamber and the lift sleeve attached thereto about the support rod to move the pivot cup and the pivot ball up or down with respect to the pivot plane to position the pivot ball in contact with the pivot plane when the ball is moved downwardly and to position the pivot ball to a location spaced from and above the pivot plane when the pivot ball is moved upwardly.

2. Apparatus in accordance with claim 1 in which opposite ends of the compression spring are fixed respectively to the wheel support member and the centering cone so that a change in arcuate orientation of the cone with respect to the member is resisted by the torque loading of the compression spring.

3. A wheel balancer comprising a vertical support rod, a tapered member disposed coaxially about the support rod for entering the opening in the center of the wheel and engaging the portion of the wheel which defines the opening, an annular flange extending around the tapered member for engaging and supporting the wheel, spring means disposed coaxially about the support rod and having its ends secured one to the tapered member and one to the annular flange for providing relative vertical movement between the flange and the tapered member to center the wheel on the balancer, said spring means resiliently maintaining the horizontal angular orientation of the tapered member with respect to the flange substantially the same, whereby the balance of the wheel balancer is not upset when a wheel is rotated about the tapered member, a pivot ball and a flat surface located at the end of the support rod for supporting the tapered member and the flange, independent means operable to support the tapered member and the flange independent of the pivot ball to protect the pivot ball and flat surface when a wheel is being positioned on the balancer, and a spirit level coupled to the flange for indicating the attitude of the flange, the spirit level having a transparent cover with a concave under-surface defining a portion of a sphere of large radius, a chamber below the transparent cover partially filled with a liquid to provide a large gas bubble, the outer periphery of the chamber having an annular band extending around it which is different color than the remainder of the chamber so that the interface between the bubble and the liquid concentrates the reflection of the differently colored band to permit easy observation of the bubble.

4. In an automotive wheel balancer having a base member from which a support rod extends vertically and a wheel support assembly tiltable with respect to the support rod the combination comprising a pivot plane supported centrally of the support rod, a pivot cup, a pivot boss projecting downwardly from the cup, a pivot ball held partially within the boss and adapted to contact the pivot plane, a spirit level affixed to the pivot cup so that it indicates the true horizontal condition of the wheel support assembly when the pivot ball seats freely on the pivot plane, a lift sleeve disposed about the support rod, a lift collar disposed at the top of the lift sleeve, a chamfered aperture disposed centrally of the lift collar, a tapered periphery on a portion of the pivot boss extending below the pivot cup, the periphery of the pivot boss being co-axially oriented with respect to the pivot ball in the boss, the diameters of the tapered periphery and the chamfered aperture being such that an annular clearance exists between the periphery and the aperture when the pivot ball seats upon the pivot plane, a tubular column fixed to the pivot cup and depending therefrom, about the lift sleeve, a wheel support member fixed to the column, a compression spring about the column so as to bear against the wheel support member, a centering cone slidable along the column against the compression spring, a wheel support flange on the wheel support member, the support member, centering cone, pivot cup and column defining the wheel support assembly, a fluid chamber disposed co-axially about the wheel support member, a cam on the base member and disposed about the support rod, a control handle rotatable about the support rod and movable along the cam, the cam being adapted to move the control handle vertically to displace the fluid chamber and the lift sleeve to move the pivot cup and the pivot ball up or down with respect to the pivot plane to position the pivot ball in contact with the pivot plane when the ball is moved downwardly and to position the pivot ball to a location spaced from and above the pivot plane when the pivot ball is moved upwardly.

5. In an automotive wheel balancer having a base member from which a support rod extends vertically and a wheel support assembly tiltable with respect to the support rod the combination comprising a pivot plane supported centrally of the support rod, a pivot cup, a pivot ball fixed to the pivot cup and adapted to contact the pivot plane, a spirit level affixed to the pivot cup so that it indicates the true horizontal condition of the wheel support assembly when the pivot ball seats freely on the pivot plane, a lift sleeve disposed about the support rod, a lift collar disposed at the top of the lift sleeve, the lift collar being adapted to lift the wheel support assembly so that the pivot ball no longer contacts the pivot plane, said lift collar being mechanically fitted to the pivot cup so that horizontal displacement of the pivot cup with respect to the lift collar may take place within defined limits, a tubular column fixed to the pivot cup and depending therefrom about the lift sleeve, a wheel support member fixed to the column, a compression spring about the column so as to bear against the wheel support member, a centering cone slidable along the column against the compression spring, a wheel support flange on the wheel support member, the support member, centering cone, pivot cup and column defining the wheel support assembly, a fluid chamber disposed co-axially about the wheel support member, the fluid chamber being fixed at its bottom wall to the lift sleeve, a cam on the base member and disposed about the support rod, a control handle rotatable about the support rod and movable along the cam, the cam being adapted to move the control handle vertically to displace the fluid chamber and the lift sleeve, said lift sleeve thereby moving the pivot cup and the pivot ball fixed thereto up or down with respect to the pivot plane to position the pivot ball in contact with the pivot plane when the ball is moved downwardly and to position the pivot ball to a location spaced from and above the pivot plane when the pivot ball is moved upwardly.

References Cited in the file of this patent
UNITED STATES PATENTS

| 1,729,947 | Lannen | Oct. 1, 1929 |
| 1,898,367 | Heinze | Feb. 21, 1933 |
| 2,301,958 | Lannen | Nov. 17, 1942 |
| 2,306,528 | Davis | Dec. 29, 1942 |
| 2,308,950 | Hulslander | Jan. 19, 1943 |
| 2,432,124 | Raines et al. | Dec. 9, 1947 |
| 2,462,266 | Howard | Feb. 22, 1949 |
| 2,493,872 | Henry | Jan. 10, 1950 |
| 2,502,633 | Shepard | Apr. 4, 1950 |
| 2,565,732 | Koertge et al. | Aug. 28, 1951 |
| 2,592,804 | Holl | Apr. 15, 1952 |

FOREIGN PATENTS

| 1,014,484 | France | Aug. 18, 1952 |